US012773625B2

(12) United States Patent
John

(10) Patent No.: US 12,773,625 B2
(45) Date of Patent: Oct. 27, 2026

(54) COMPUTER GAMING SYSTEMS AND METHODS FACILITATING PROGRESSIVE ADVANCEMENT

(71) Applicant: Truist Bank, Charlotte, NC (US)

(72) Inventor: Michael Taylor John, San Francisco, CA (US)

(73) Assignee: TRUIST BANK, Charlotte, NC (US)

( * ) Notice: Subject to any disclaimer, the term of this patent is extended or adjusted under 35 U.S.C. 154(b) by 301 days.

(21) Appl. No.: 18/476,408

(22) Filed: Sep. 28, 2023

(65) Prior Publication Data

US 2025/0108294 A1 Apr. 3, 2025

(51) Int. Cl.

*A63F 13/493* (2014.01)
*A63F 13/71* (2014.01)
*G07F 17/32* (2006.01)

(52) U.S. Cl.

CPC ............ *A63F 13/493* (2014.09); *A63F 13/71* (2014.09); *G07F 17/3255* (2013.01); *G07F 17/3258* (2013.01)

(58) Field of Classification Search

CPC .... A63F 13/493; A63F 13/71; G07F 17/3255; G07F 17/3258

USPC ............................................................ 463/24

See application file for complete search history.

(56) References Cited

U.S. PATENT DOCUMENTS

| | | | |
|---|---|---|---|
| 7,022,017 B1 | 4/2006 | Halbritter | |
| 7,997,969 B1 * | 8/2011 | Murrell | G06Q 40/00 463/9 |
| 8,777,735 B1 | 7/2014 | Fine | |
| 2002/0090985 A1 | 7/2002 | Tochner | |
| 2006/0240845 A1 | 10/2006 | Feuerstein | |
| 2010/0299556 A1 | 11/2010 | Taylor | |

(Continued)

FOREIGN PATENT DOCUMENTS

AU 2013100954 A4 * 10/2013

OTHER PUBLICATIONS

"Truist Plays 'Long Game' with Gamified Mobile App to Boost Deposits" by Steve Cocheo; dated Jun. 7, 2023; URL: https://thefinancialbrand.com/news/mobile-banking-trends/truist-plays-long-game-to-boost-deposits-and-financial-education-163270 (Year: 2023).*

*Primary Examiner* — Allen Chan

(74) *Attorney, Agent, or Firm* — Michael A. Springs, Esq.; Shumaker, Loop & Kendrick, LLP; Patrick B. Horne

(57) ABSTRACT

Systems and methods determine a game user has completed a predetermined amount of actions within a game, each action being limited by an amount of allocated resources attributed to the game user, and ascertain whether opportunities for game advancement remain after completion of the predetermined amount of actions. The ascertaining includes identifying opportunity(s) for game advancement, and based on opportunity(s) being identified, data associated with a current progress level of the game user within the game is stored. Further, authentication information to access the game is received and verified to match stored credentials of the game user. Based thereon systems and methods evaluate whether additional resources are available to the game user, and based on the additional resources being available, a control signal is transmitted to an electronic device to cause the electronic device to provide access to the game at the current progress level.

14 Claims, 6 Drawing Sheets

(56) References Cited

U.S. PATENT DOCUMENTS

| | | | | |
|---|---|---|---|---|
| 2013/0097060 | A1 * | 4/2013 | Taylor .................... | G06Q 40/00<br>705/35 |
| 2020/0228610 | A1 * | 7/2020 | Fisher ................... | H04L 67/147 |
| 2020/0372823 | A1 * | 11/2020 | Edwards ................ | G09B 19/18 |
| 2024/0194025 | A1 | 6/2024 | Shepherd | |

* cited by examiner

COMPUTER GAMING SYSTEMS AND METHODS FACILITATING PROGRESSIVE ADVANCEMENT

FIELD OF THE INVENTION

This invention relates generally to the field of computer gaming, and more particularly embodiments of the invention relate to computer gaming systems and methods of facilitating progressive advancement.

BACKGROUND OF THE INVENTION

Video game users enjoy video games for a number of reasons, whether it be the ability to explore captivating worlds, overcoming formidable challenges, experiencing a surge of achievement, developing a skill, or feeling a sense of accomplishment for completing a task. In free gameplay, in order to advance to a certain level or access certain functionalities in the video games, often the video game users need to perform some kind of action. Sometimes such actions include accumulating and expending resources. There are many games, however, that are not designed in a way that would enable gameplay to be paused, in which case the accumulated and expended resources could not be saved. This problem can negatively impact game user retention as the video game users feel a lack of motivation to continue playing the game. For example, the video game users may feel that they have wasted their time and may feel reluctant to invest more time in playing the video games if their progress cannot be saved. Thus, poor video game development can detrimentally affect the gaming experience of the video game users. A need exists for improved video game development that addresses these shortcomings.

BRIEF SUMMARY

Shortcomings of the prior art are overcome and additional advantages are provided through the provision of a computer gaming system for facilitating progressive advancement. The computing system includes at least one processor, a communication interface communicatively coupled to the at least one processor, and a memory device storing executable code that, when executed, causes the at least one processor to, in part, determine that a game user has completed a predetermined amount of actions within a game, wherein each action of the predetermined amount of actions is limited by an amount of allocated resources attributed to the game user. Further, the system ascertains whether opportunities for game advancement remain after the game user has completed the predetermined amount of actions, wherein the ascertaining comprises identifying at least one opportunity for game advancement. Based on identifying the at least one opportunity for game advancement, data associated with a current progress level of the game user within the game is stored. Transmitted authentication information to access the game is received, and the system verifies that the authentication information received matches stored credentials of the game user from a database of authorized users, and based on the verifying the system evaluates whether additional resources are available to the game user. Based on the additional resources being available to the game user, a control signal is transmitted to an electronic device to cause the electronic device to provide access, via a user interface of the electronic device, to the game at the current progress level.

Additionally, disclosed herein is a computer system for facilitating progressive advancement via a computer game. The computing system includes at least one processor, a communication interface communicatively coupled to the at least one processor, and a memory device storing executable code that, when executed, causes the at least one processor to, in part, track a first instance of gameplay of a user within the computer game, the first instance of gameplay comprising a plurality of user actions of the user, wherein each action of the user actions is capable of being performed based on the user allocating a resource to perform each action. Further, the system determines that the user intends to pause the first instance of gameplay, and based thereon save a current progress level of the first instance of gameplay, and detects that the user is initiating a second instance of gameplay. Based thereon, the current progress level of the first instance of gameplay is restored.

Also disclosed herein is a computer-implemented method for facilitating progressive gameplay advancement. The computer-implemented method includes, in part, determining that a game user has completed a predetermined amount of actions within a game, wherein each action of the predetermined amount of actions is limited by an amount of allocated resources attributed to the game user. Further, the method includes ascertaining whether opportunities for game advancement remain after the game user has completed the predetermined amount of actions, wherein the ascertaining comprises identifying at least one opportunity for game advancement. Based on identifying the at least one opportunity for game advancement, data associated with a current progress level of the game user within the game is stored, and the method includes receiving transmitted authentication information to access the game. The method also includes verifying that the authentication information received matches stored credentials of the game user from a database of authorized users, and based on the verifying evaluating whether additional resources are available to the game user, and based on the additional resources being available to the game user, a control signal is transmitted to an electronic device to cause the electronic device to provide access, via a user interface of the electronic device, to the game at the current progress level.

The features, functions, and advantages that have been described herein may be achieved independently in various embodiments of the present invention including computer-implemented methods, computer program products, and computing systems or may be combined in yet other embodiments, further details of which can be seen with reference to the following description and drawings.

BRIEF DESCRIPTION

One or more aspects are particularly pointed out and distinctly claimed as examples in the claims at the conclusion of the specification. The foregoing as well as objects, features, and advantages of one or more aspects are apparent from the following detailed description taken in conjunction with the accompanying drawings in which:

DETAILED DESCRIPTION

Figure 1:
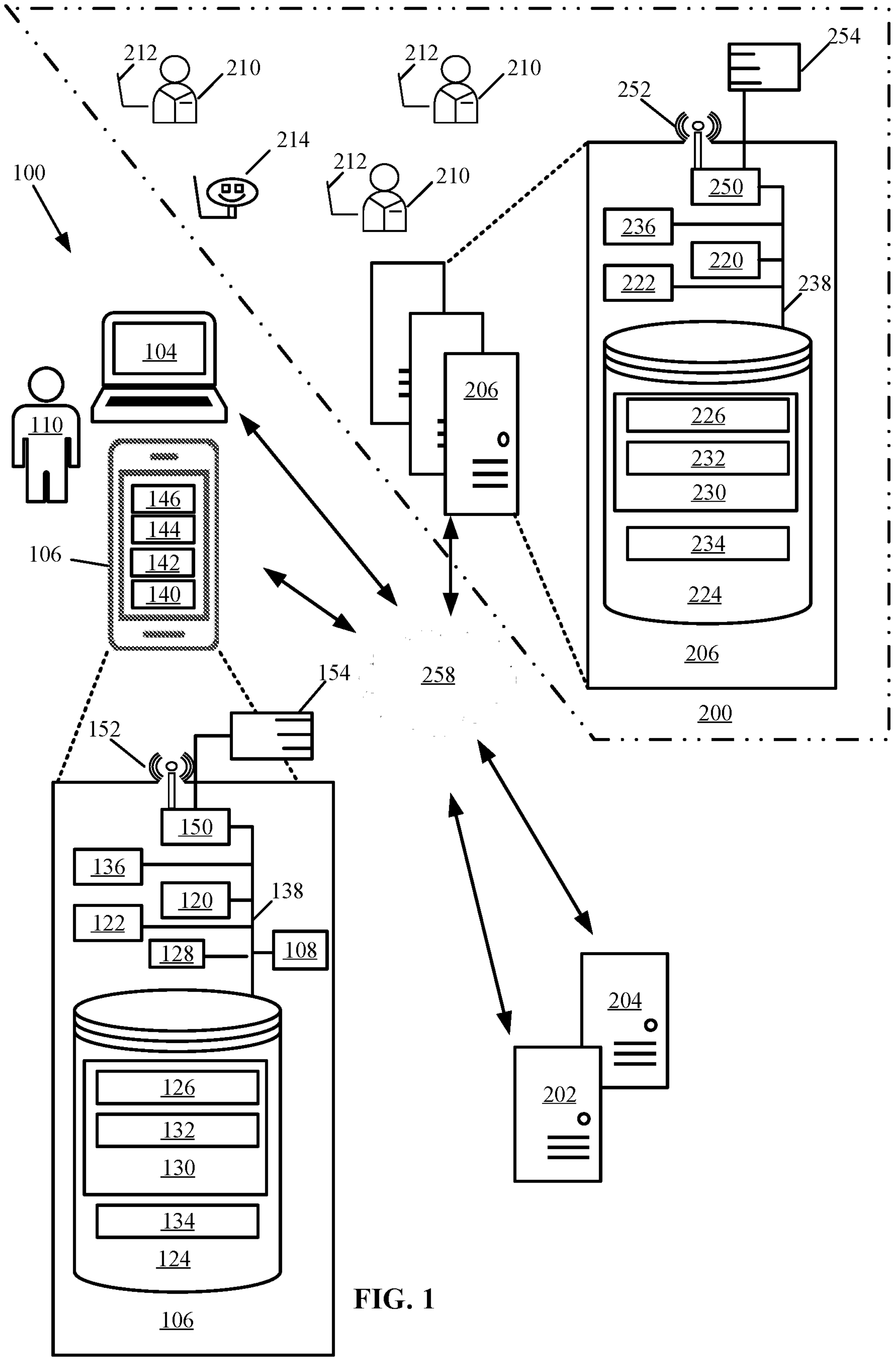
FIG. 1 illustrates a computing environment that includes a computer gaming system for facilitating progressive advancement, in accordance with an embodiment of the present invention.

Aspects of the present invention and certain features, advantages, and details thereof are explained more fully below with reference to the non-limiting examples illustrated in the accompanying drawings. It is to be understood that the disclosed embodiments are merely illustrative of the present invention and the invention may take various forms. Further, the figures are not necessarily drawn to scale, as some features may be exaggerated to show details of particular components. Thus, specific structural and functional details illustrated herein are not to be interpreted as limiting, but merely as a representative basis for teaching one skilled in the art to employ the present invention.

Descriptions of well-known processing techniques, systems, components, etc. are omitted to not unnecessarily obscure the invention in detail. It should be understood that the detailed description and the specific examples, while indicating aspects of the invention, are given by way of illustration only, and not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular embodiment of the concepts disclosed herein.

The specification may include references to "one embodiment," "an embodiment," "various embodiments," "one or more embodiments," etc. may indicate that the embodiment(s) described may include a particular feature, structure or characteristic, but every embodiment may not necessarily include the particular feature, structure, or characteristic. In some cases, such phrases are not necessarily referencing the same embodiment. When a particular feature, structure, or characteristic is described in connection with an embodiment, such description can be combined with features, structures, or characteristics described in connection with other embodiments, regardless of whether such combinations are explicitly described. Thus, unless described or implied as exclusive alternatives, features throughout the drawings and descriptions should be taken as cumulative, such that features expressly associated with some particular embodiments can be combined with other embodiments.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method, step of a method, device or element of a device that "comprises," "has," "includes," or "contains," or uses similar language to describe one or more steps or elements possesses those one or more steps or elements, but is not limited to possessing only those one or more steps or elements. Furthermore, a device or structure that is configured in a certain way is configured in at least that way, but may also be configured in ways that are not listed.

Like numbers refer to like elements throughout. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "couple," "coupled," "connected," and the like should be broadly understood to refer to connecting two or more elements or signals electrically and/or mechanically, either directly or indirectly through intervening circuitry and/or elements. Two or more electrical elements may be electrically coupled, either direct or indirectly, but not be mechanically coupled; two or more mechanical elements may be mechanically coupled, either direct or indirectly, but not be electrically coupled; two or more electrical elements may be mechanically coupled, directly or indirectly, but not be electrically coupled. Coupling (whether only mechanical, only electrical, or both) may be for any length of time, e.g., permanent or semi-permanent or only for an instant. "Communicatively coupled to" and "operatively coupled to" can refer to physically and/or electrically related components.

In addition, as used herein, the terms "about," "approximately," or "substantially" for any numerical values or ranges indicate a suitable dimensional tolerance that allows the device, part, or collection of components to function for its intended purpose as described herein.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

Additionally, illustrative embodiments are described below using specific code, designs, architectures, protocols, layouts, schematics, or tools only as examples, and not by way of limitation. Furthermore, the illustrative embodiments are described in certain instances using particular software, tools, or data processing environments only as example for clarity of description. The illustrative embodiments can be used in conjunction with other comparable or similarly purposed structures, systems, applications, or architectures. One or more aspects of an illustrative embodiment can be implemented in hardware, software, or a combination thereof.

As understood by one skilled in the art, program code can include both software and hardware. For example, program code in certain embodiments of the present invention can include fixed function hardware, while other embodiments can utilize a software-based implementation of the functionality described. Certain embodiments combine both types of program code.

As used herein, the terms "enterprise" or "provider" generally describes a person or business enterprise (e.g., company, organization, institution, business, university, etc.) that hosts, maintains, or uses computer systems that provide functionality for the disclosed systems and methods. In particular, the term "enterprise" may generally describe a person or business enterprise providing goods and/or services. Interactions between an enterprise system and a user device can be implemented as an interaction between a computing system of the enterprise and a user device of a user. For instance, user(s) may provide various inputs that can be interpreted and analyzed using processing systems of the user device and/or processing systems of the enterprise system. Further the enterprise computing system and the user device may be in communication via a network. According to various embodiments, the enterprise system and/or user device(s) may also be in communication with an external or third-party server of a third party system that may be used to perform one or more server operations. In some embodiments, the functions of one illustrated system or server may be provided by multiple systems, servers, or computing devices, including those physically located at a central computer processing facility and/or those physically located at remote locations.

Embodiments of the present invention are described herein with reference to flowchart illustrations and/or block diagrams of computer-implemented method(s) and computing system(s). Each block or combinations of blocks of the flowchart illustrations and/or block diagrams can be implemented by computer readable program instructions or code that may be provided to a processor of a general purpose computer, special purpose computer, programmable data processing apparatus or apparatuses (the term "apparatus" includes systems and computer program products), and/or other device(s). In particular, the computer readable program instructions, which can be executed via the processor of the computer, programmable data processing apparatus, and/or other device(s), create a means for implementing the functions/acts specified in the flowchart and/or block diagram block(s).

In one embodiment, computer readable program instructions may also be stored in one or more computer-readable storage media that can direct a computer, programmable data processing apparatus, and/or other device(s) to function in a particular manner such that a computer readable storage medium of the one or more computer-readable storage media having instructions stored therein comprises an article of manufacture that includes the computer readable program instructions, which implement aspects of the actions specified in the flowchart illustrations and/or block diagrams. In particular, the computer-readable program instructions may be used to produce a computer-implemented method by executing the instructions to implement the actions specified in the flowchart illustrations and/or block diagram block(s). Additionally or alternatively, these computer program instructions may be stored in a computer-readable memory that can direct a computer, programmable data processing apparatus, and/or other device(s) to function in a particular manner such that the instructions stored in the computer readable memory produce an article of manufacture that includes the computer readable program instructions, which implement the function/act specified in the flowchart and/or block diagram block(s). In some embodiments, computer-implemented steps/acts may be performed in combination with operator/human implemented steps/acts in order to carry out an embodiment of the invention.

In the flowchart illustrations and/or block diagrams disclosed herein, each block in the flowchart/diagrams may represent a module, segment, a specific instruction/function or portion of instructions/functions, and incorporates one or more executable computer readable program instructions for implementing the specified logical function(s). Similarly, alternative implementations and processes may also incorporate various blocks of the flowcharts and block diagrams. For instance, in some implementations the functions noted in the blocks may occur out of the order noted in the figures. For example, two blocks shown in succession may be executed substantially concurrently, and/or the functions of the blocks may sometimes be executed in the reverse order, depending upon the functionality involved.

FIG. 1 illustrates a computing environment 100 that includes a computer gaming system for facilitating progressive advancement, according to at least one embodiment of the present invention. The computing environment 100 generally includes a user 110 (e.g., customer of the enterprise) that benefits through use of services and products offered by an enterprise system 200. Use of the words "service(s)" or "product(s)" as used herein can be interchangeable. The user 110 can be an individual, a group, or any entity in possession of or having access to the user device 104, 106, which may be personal, enterprise, or public items. Although the user 110 may be singly represented in some figures, in at least in some embodiments the user 110 is one of many such that a market or community of users, consumers, customers, business entities, government entities, clubs, and groups of any size.

The computing environment 100 may include, for example, a distributed cloud computing environment (private cloud, public cloud, community cloud, and/or hybrid cloud), an on-premise environment, fog-computing environment, and/or an edge-computing environment. The user 110 accesses services and products of the enterprise system 200 by use of one or more user devices, illustrated in separate examples as user devices 104, 106. Example user devices 104, 106 may include a laptop, desktop computer, tablet, a mobile computing device such as a smart phone, a portable digital assistant (PDA), a pager, a mobile television, a gaming device, an audio/video player, a virtual assistant device or other smart home device, a wireless personal response device, or any combination of the aforementioned, or other portable device with processing and communication capabilities.

In the illustrated example, the mobile device 106 is illustrated in FIG. 1 as having exemplary elements, the below descriptions of which apply as well to the computing device 104. The user device 104, 106 can include integrated software applications that manage device resources, generate user interfaces, accept user inputs, and facilitate communications with other devices among other functions. The integrated software applications can include an operating system, such as Linux®, UNIX®, Windows®, macOS®, iOS®, Android®, or other operating system compatible with personal computing devices. Furthermore, the user device 104, 106 may be and/or include a workstation, a server, a set of servers, a cloud-based application or system, or any other suitable system or device adapted to execute any suitable operating system used on personal computers, central computing systems, phones, and/or other devices.

The user device 104, 106, but as illustrated with specific reference to the mobile device 106, includes at least one of each of a processor 120, and a memory device 122 for processing use, such as random access memory (RAM), and read-only memory (ROM), and other various components. The illustrated mobile device 106 further includes a storage device 124 including at least one of a non-transitory storage medium, such as a microdrive, for long-term, intermediate-term, and short-term storage of computer-readable program instructions 126 for execution by the processor 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and/or other data items preferred by the user or otherwise required or related to any or all of the applications or programs 130.

The memory device 122 is operatively coupled to the processor 120. As used herein, memory device 122 includes store any computer readable medium configured to store data, code, and/or other information. The memory device 122 may include volatile memory, such as volatile Random Access Memory (RAM), and/or a cache area for the temporary storage of data. The memory device 122 may also include non-volatile memory and may be embedded and/or may be removable. The non-volatile memory additionally or alternatively can include an electrically erasable programmable read-only memory (EEPROM), flash memory, or the like.

According to various embodiments, the memory device 122 and storage device 124 may be combined into a single storage medium. The memory device 122 and storage device 124 can store any of a number of applications that comprise computer-executable program instructions or code executed by the processing device 120 to implement, via the user device 104, 106, the functions described herein. For example, the memory device 122 may store applications and/or association data related to a conventional web browser application and/or an enterprise-distributed application (e.g., a mobile application). These applications also typically provide a graphical user interface (GUI) that is displayed via the display 140 that allows the user 110 to perform functions via the application including to communicate, via the user device 104, 106 with the enterprise system 200, and/or other devices or systems. The GUI on the display 140 may include features for displaying information and accepting inputs from users, and may include input controls such as fillable text boxes, data fields, hyperlinks, pull down menus, check boxes, and the like.

In various embodiments, the user 110 may download, sign into, or otherwise access the application from an enterprise system 200 or from a distinct application server. In other embodiments, the user 110 interacts with the enterprise system 200 via a web browser application in addition to, or instead of, the downloadable version of the application.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 may also include the functionality to encode and interleave messages and data prior to modulation and transmission. The processing device 120 can additionally include an internal data modem to convert data from digital format to a format suitable for analog transmission. Further, the processing device 120 may include functionality to operate one or more software programs, which may be stored in the memory device 122 or in the storage device 124. For example, the processing device 120 may be capable of operating a connectivity program such as a web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like.

The memory device 122 and storage device 124 can each also store any of a number of pieces of information and data that are used by the user device 104, 106 as well as the applications and devices that facilitate functions of the user device 104, 106, or that are in communication with the user device 104, 106, to implement the functions described herein, and other functions not expressly described. For example, the storage device 124 may include user authentication information data as well as other data.

The processing device 120, in various examples, can operatively perform calculations, can process instructions for execution, and can manipulate information. The processing device 120 can execute machine-executable program instructions stored in the storage device 124 and/or memory device 122 to perform the methods and functions as described or implied herein. Specifically, the processing device 120 can execute machine-executable instructions to perform actions as expressly provided in one or more corresponding flow charts and/or block diagrams or as would be impliedly understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, one or more user input devices and/or one or more user output devices, which are operatively coupled to the processing device 120. The input and output system 136 may include input/output circuitry that may operatively convert analog signals and other signals into digital data, or may convert digital data to another type of signal. For example, the input/output circuitry may receive and convert physical contact inputs, physical movements, or auditory signals (e.g., which may be used to authenticate a user) to digital data. Once converted, the digital data may be provided to and processed by the processing device 120. The input and output system 136 may also include a display 140 (e.g., a liquid crystal display (LCD), light emitting diode (LED) display, or the like), which can be, as a non-limiting example, a presence-sensitive input screen (e.g., touch screen or the like) of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices may include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, infrared sensor, and/or other input device(s). The input and output system 136 may also include a camera 146, such as a digital camera.

Non-limiting examples of input devices and/or output devices of the input and output system 136 may include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and the enterprise system 200.

In some embodiments, a credentialed system enabling authentication of a user may be necessary in order to provide access to the enterprise system 200. In one embodiment, the input and output system 136 may be configured to obtain and process various forms of authentication to authenticate a user 110 prior to providing access to the enterprise system 200. Various authentication systems may include, according to various embodiments, a recognition system that detects biometric features or attributes of a user such as, for example fingerprint recognition systems and the like (hand print recognition systems, palm print recognition systems, etc.), iris recognition and the like used to authenticate a user based on features of the user's eyes, facial recognition systems based on facial features of the user, DNA-based authentication, or any other suitable biometric attribute or information associated with a user. Additionally or alternatively, voice biometric systems may be used to authenticate a user using speech recognition associated with a word, phrase, tone, or other voice-related features of the user. Alternate authentication systems may include one or more systems to identify a user based on a visual or temporal pattern of inputs provided by the user. For instance, the user device may display selectable options, shapes, inputs, buttons, numeric representations, etc. that must be selected in a pre-determined specified order or according to a specific pattern. Other authentication processes are also contemplated herein including, for example, email authentication, password protected authentication, device verification of saved devices, code-generated authentication, text message authentication, phone call authentication, etc. The user device may enable users to input any number or combination of authentication systems.

The user device, referring to either or both of the computing device 104 and the mobile device 106 may also include a positioning device 108, which can be for example a global positioning System (GPS) transceiver configured to be used by a positioning system to determine a location of the computing device 104 or mobile device 106. In some embodiments, the positioning system device 108 includes an antenna, transmitter, and receiver. In one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138 (e.g., system bus), electrically connects the various described, illustrated, and implied components of the mobile device 106. The intraconnect 138, in various non-limiting examples, can include or represent, a system bus, a high-speed interface connecting the processing device 120 to the memory device 122, providing electrical connections among the components of the mobile device 106, and may include electrical conductive traces on a motherboard common to some or all of the above-described components of the user device (referring to either or both of the computing device 104 and the mobile device 106). As discussed herein, the system intraconnect 138 may operatively couple various components with one another, or in other words, electrically connects those components either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide wired (e.g., via wired or docked communication by electrically conductive connector 154) or wireless (e.g., via wireless communication device 152) two-way communications and data exchange. Communications may be conducted via various modes or protocols, of which GSM voice calls, short message service (SMS), enterprise messaging service (EMS), multimedia messaging service (MMS) messaging, TDMA, CDMA, PDC, WCDMA, CDMA2000, and GPRS, are all non-limiting and non-exclusive examples. Wireless communications may be conducted via the wireless communication device 152, which can include, as non-limiting examples, a radio-frequency transceiver, a Bluetooth device, Wi-Fi device, a Near-field communication device, and other transceivers. In addition, GPS connections may be included for ingoing and/or outgoing navigation and location-related data exchanges. Wired communications may be conducted, e.g., via the connector 154, by USB, Ethernet, and/or other physically connected modes of data transfer.

The processing device 120 may, for example, be configured to use the communication interface 150 as a network interface to communicate with one or more other devices on a network. In this regard, the communication interface 150 utilizes the wireless communication device 152 such as an antenna operatively coupled to a transmitter and a receiver (or together a "transceiver") included with the communication interface 150. The processing device 120 is configured to provide signals to and receive signals from the transmitter and receiver, respectively. In various embodiments, the signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, and/or fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), with fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

The computing environment 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may be utilized. In some implementations, a single system or server may provide the functions of one or more systems, servers, or illustrated components. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, near-field communication device, and other transceivers. In addition, GPS may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the computing device 104 and mobile device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

The network 258 may incorporate a cloud platform/data center that support various service models including Platform as a Service (PaaS), Infrastructure-as-a-Service (IaaS), and Software-as-a-Service (SaaS). Such service models may provide, for example, a digital platform accessible to the user device (referring to either or both of the computing device 104 and the mobile device 106). Specifically, SaaS may provide a user with the capability to use applications running on a cloud infrastructure, where the applications are accessible via a thin client interface such as a web browser and the user is not permitted to manage or control the underlying cloud infrastructure (i.e., network, servers, operating systems, storage, or specific application capabilities that are not user-specific). PaaS also do not permit the user to manage or control the underlying cloud infrastructure, but this service may enable a user to deploy user-created or acquired applications onto the cloud infrastructure using programming languages and tools provided by the provider of the application. In contrast, IaaS provides a user the permission to provision processing, storage, networks, and other computing resources as well as run arbitrary software (e.g., operating systems and applications) thereby giving the user control over operating systems, storage, deployed applications, and potentially select networking components (e.g., host firewalls).

The network 258 may also incorporate various cloud-based deployment models including private cloud (i.e., an organization-based cloud managed by either the organization or third parties and hosted on-premises or off premises), public cloud (i.e., cloud-based infrastructure available to the general public that is owned by an organization that sells cloud services), community cloud (i.e., cloud-based infrastructure shared by several organizations and manages by the organizations or third parties and hosted on-premises or off premises), and/or hybrid cloud (i.e., composed of two or more clouds e.g., private community, and/or public).

Two external systems 202 and 204 are expressly illustrated in FIG. 1, representing any number and variety of data sources, users, consumers, customers, business entities, systems, entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes. The enterprise system 200 may communicate with the external system 202, 204 using any combination of public or private communication.

In certain embodiments, one or more of the systems such as the user device (referring to either or both of the computing device 104 and the mobile device 106), the enterprise system 200, and/or the external systems 202 and 204 are, include, or utilize virtual resources. In some cases, such virtual resources are considered cloud resources or virtual machines. The cloud computing configuration may provide an infrastructure that includes a network of interconnected nodes and provides stateless, low coupling, modularity, and semantic interoperability. Such interconnected nodes may incorporate a computer system that includes one or more processors, a memory, and a bus that couples various system components (e.g., the memory) to the processor. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

According to one embodiment, a user 110 may initiate an interaction with the enterprise system 200 via the user device 104, 106 and based thereon the enterprise system 200 may transmit, across a network 258, to the user device 104, 106 digital communication(s). In order to initiate the interaction, the user 110 may select, via display 140, a mobile application icon of a computing platform of the enterprise system 200, login via a website to the computing platform of the enterprise system 200, or perform various other actions using the user device 104, 106 to initiate the interaction with the enterprise system 200. In other embodiments, the enterprise system 200 may initiate the interaction with the user 110 via the user device 104, 106. For instance, periodically the enterprise system 200 may transmit unprompted communication(s) such as a short message service (SMS) text message, multimedia message (MMS), or other messages to the user device 104, 106 that includes an embedded link, a web address (e.g., a uniform resource locator (URL)), a scannable code (e.g., a quick response (QR) code, barcode, etc.) to prompt the user 110 to interact with the enterprise system 200.

Once an interaction has been established between the enterprise system 200 and the user device 104, 106, data and/or other information may be exchanged via data transmission or communication in the form of a digital bit stream or a digitized analog signal that is transmitted across the network 258. Based on the user 110 of the user device 104, 106 providing one or more user inputs (e.g., via the user interface, via a speech signal processing system, etc.) data may be received by the enterprise system 200 and data processing is performed thereon using, for example, processing device 220. This received data may then be stored to the storage device 224 or to a third party storage resource such as, for example, external systems 202, 204, which may include a cloud storage service or remote database. Additionally, this collected response data may be aggregated in order to allow the enterprise to have a sampling of responses from multiple users 110. Such aggregated data may be accessible by a relational database management system (e.g., Microsoft SQL server, Oracle Database, MySQL, PostgreSQL, IBM Db2, Microsoft Access, SQLite, MariaDB, Snowflake, Microsoft Azure SQL Database, Apache Hive, Teradata Vantage, etc.) or other software system that enables users to define, create, maintain and control access to information stored by the storage device 224, database, and/or other external systems 202, 204. According to one embodiment, the relational database management system may maintain relational database(s) and may incorporate structured query language (SQL) for querying and updating the database. The relational database(s) may organize data into one or more tables or "relations" of columns (e.g., attributes) and rows (e.g., record), with a unique key identifying each row. According to various embodiments, each table may represent a user/customer profile and the various attributes and/or records may indicate attributes attributed to the user/customer.

For instance, the user/customer profiles may be classified based on various designations/classifiers such as their financial assets, income, bank account types, age, geographic region(s), etc. Each designation/classifier may also include a plurality of sub categories. Storing the collected data to the relational database of the relational database management system may facilitate sorting of the data to filter based on various categories and/or subcategories and/or performing data analytics thereon. According to some embodiments, the enterprise system 200 may utilize algorithms in order to categorize or otherwise classify the data.

The collected data may also have metadata associated therewith that can be accessed by the enterprise system 200. The metadata may include, for example, (i) sequencing data representing the data and time when the response data was created, (ii) modification data indicating the individual (such as user 110) that last modified specific information/data, (iii) weighting data representing the relative importance or magnitude of the attributes, (iv) provider identifier data identifying the owner of the data (e.g., the entity that operates the enterprise system 200), and/or (v) other types of data that could be helpful to the enterprise in order to classify and analyze the collected data.

According to one embodiment, the relational database(s) may store data associated with user/customer profiles in order to sync this data with a gaming functionality and/or application. In particular, the enterprise system 200 may include an enterprise mobile software application that includes a gaming functionality that may be installed on or otherwise accessed by the user device 104, 106. When the user 110 accesses the gaming functionality, the user 110 may be rewarded by performing various tasks. In particular, the user 110 may receive rewards for accomplishing various goals related to financial wellness. The gaming functionality may help the user develop smart financial habits with monetary rewards for developing these habits and is rooted in behavioral economics.

In general, the gaming application disclosed herein may operate via external systems 202, 204 and provides front-end functionalities that enable the user 110 to interact with games. In particular, the external systems 202, 204 may host the game server(s). In one embodiment, the external systems 202, 204 include Amazon Web Services (AWS), which provides a workflow for developing, deploying, and hosting the gaming application. Further, the games may incorporate user/customer profiles that may be linked to that specific user's/customer's profile that is stored within or otherwise associated with the enterprise system 200. By syncing the user/customer profile for the gaming application with the user/customer profile of the enterprise system 200, the gaming application can access information about the user 110 that is derived from the user/customer profile of the enterprise system 200. This enables the gaming application to utilize user/customer data in order to personalize the game in accordance with various enterprise objectives. In a non-limiting example, user/customer data stored by the enterprise system 200 that indicates current account balances may be accessed by the game server(s) of the external system 202, 204 in order to personalize the gaming experience for the user 110 by encouraging certain financial behaviors. Other external system 202, 204 may include promotional prize server(s) that can be configured to generate one or more random numeric outcomes based on one or more rules defining a win likelihood.

To perform various functionalities associated with the gaming application, the game server(s) may be configured to make an API call to the prize server(s) to provide information necessary to generate a random numeric outcome. For instance, the API call may indicate a current game at a current level, and the prize server(s) process the information provided to generate a random number based on that information in accordance with various rules defining a win likelihood. The prize server(s) then provide results from the random number generator, which is used to determine a monetary reward in response to the actions performed by the user 110. In addition, the monetary rewards obtained as a result of performing various actions via the gaming application may be transferred to user/customer accounts identified by the user/customer profile of the enterprise.

Figure 2:
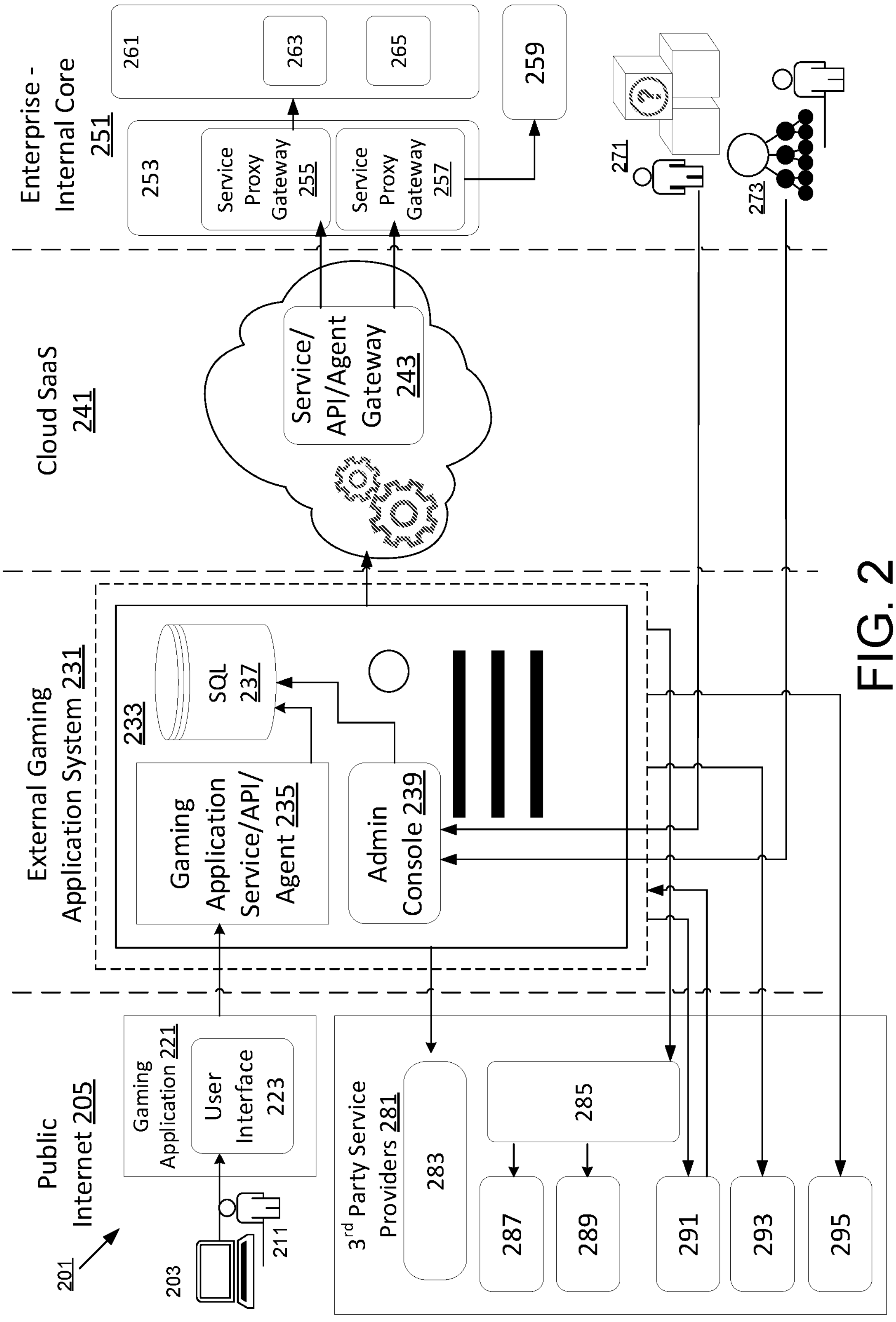
FIG. 2 depicts an example flow diagram for network communication associated with a gaming application, in accordance with an embodiment of the present invention.

FIG. 2 depicts an example flow diagram 201 for network communication associated with an external gaming application system 231, in accordance with an embodiment of the present invention. In particular, the flow diagram 201 depicts a user 211 providing one or more inputs, via a user device 203, to access the gaming application 221 across a public network 205 (e.g., public internet). The gaming application 221 includes a user interface 223 through which the user 211 interacts in order to play electronic game(s) (i.e., video game(s)). The game(s) may be played when the user 211 interacts via the user interface 223 and/or through other input device(s) (e.g., a joystick, controller, keyboard, motion sensing device, etc.). Inputs provided by the user 211 may generate visual feedback through a display of the user device 203.

The gaming application 221 is configured to communicate with an external gaming application system 231 that include server(s) 233 that are used to host the gaming application 221. Example cloud-based sever(s) 233 include, for example, AWS. The cloud-based server(s) 233 that host the gaming application 221 include the gaming application service/API/agent 235 that receives an API call from the gaming application 221. The API call utilizes a uniform resource identifier (URI), such as a URL, that identifies the cloud-based server(s) 233, incorporates the application layer protocol (e.g., the HTTP method) indicating the desired action to be performed by the service/API/agent 235 (e.g., the data to be extracted, the functionality to be performed, etc.), includes a header so that the service/API/agent 235 understands the request, and includes an API key or access token used by the service/API/agent 235 to authenticate the API call. The service/API/agent 235 accesses data from the relational database 237 (e.g., SQL database), which may include a collection of structured data needed for the gaming application 221 to integrate various features. The admin console 239 is used by support and developers to provide administrative functions (e.g., provide support for customers, check on the health of the external gaming application system, etc.).

The external gaming application system is integrated with a cloud SaaS 241, which is configured to receive API calls from the cloud-based server(s) 233 to access user data associated with a user profile of the user 211. In a non-limiting example, the user data includes information associated with financial services and products offered by the enterprise such as direct deposit information, current financial balance information, financial savings information, financial transaction history, etc.). The cloud SaaS 241 includes a service/API/agent gateway 243, which acts an edge gateway or network entry point for the enterprise-internal core system 251. The service/API/agent gateway 243 may provide, according to one embodiment, network translation between networks that use different protocols and may include routers, routing switches, multiplexers, etc. In one particular embodiment, the service/API/agent gateway 243 includes various permissions to perform calls to fetch the user data.

Retrieval of user data within the enterprise-internal core system 251 is facilitated by use of service proxy gateway(s) 255, 257 of the gateway platform 253. The gateway platform 253 is a multichannel API gateway configured to provide security, control, integration and optimized access to fetch user data. The service proxy gateway(s) 255, 257 are modules that receive the API requests and forward them to defined endpoints within the internal enterprise system 261. In particular, the service proxy gateway(s) 255, 257 facilitate load balancing, access filtering, caching, etc. The internal enterprise system 261 includes an API-powered business ecosystem that enables the enterprise to perform various backend services and business functionalities. The internal enterprise system 261 includes service/API/agent systems 263, 265 that can be used to access the user data from original data sources and used to facilitate payments from a holding account of the cloud-based server(s) 233 so that the financial payments can be transferred to deposit account(s) associated with the user profile of the user 211. According to various embodiments, the financial payments may be made according to a predefined schedule and/or in response to a request from the user 211. The enterprise-internal core system 251 also includes a digital identity and authentication system 259 that is used to authenticate the user 211 and link the user's gaming profile/account to their user profile associated with the enterprise. The enterprise internal core system 251 is also used by support agents 271 to provide customer support, resolve customer inquiries, etc. Further, the enterprise-internal core system 251 is used by administrators 273 to provide administrative functions for the external gaming application system 231.

Various third-party service providers 281 are also integrated with the external gaming application system 231. One example third-party service provider includes a game operator system 283 that includes promotional prize server(s) that can be configured to generate one or more random numeric outcomes based on one or more rules defining a win likelihood. A communication provider 285 may provide digital communications such as electronic messages through a communications platform 287 and push notifications through an operating system 289. A marketing analysis platform 291 may be used to analyze the efficacy of various messaging and communications associated with the gaming application system 231 and can provide feedback that can be used by the gaming application system 231 to modify functionalities to align with enterprise objectives. For example, the marketing analysis platform 291 may be used for inbound marketing channel attribution and outbound marketing channel attribution so that the enterprise may determine how marketing tactics influence customer interactions. A monitoring system provider 293 may provide off-duty support to detect problems with the gaming application system 231 by using real-time monitoring. When a problem is detected, the monitoring system provider 293 distributes an alert so that the problem can be resolved. An analytics provider 295 may analyze ways in which users interact with the gaming application system 231 in order to perform user experience analysis. Various additional or alternative third-party service providers 281 may also be utilized according to various embodiments.

In other embodiments, the external gaming application 231 is not external to the enterprise internal core 251. Rather, a gaming application may be integrated within the enterprise internal core 251, which advantageously eliminates use of the cloud SaaS 241. In particular, cloud-based server(s) 233 that host the gaming application 221, such as those provided via AWS would still host the gaming application 221, but the application system would be integrated within the enterprise internal core 251. The processes and systems described herein are not limited to the example flow diagram 201, and various other network flow communications may alternatively be implemented that would facilitate access to the gaming application 221.

Although not depicted by the workflow of flow diagram 201, in other embodiments, the user device 203 may be used to access an enterprise application rather than the gaming application 221, in which case the enterprise application is configured to communicate with the enterprise internal core 251 via service/API/agent systems 263, 265. In this embodiment, when the user 211 provides inputs via the enterprise application, which is received via service/API/agent systems 263, 265, the enterprise internal core 251 utilizes the service/API/agent gateway 243 of the cloud SaaS 241 to communicate with the external gaming application system 231. For instance, this embodiment may be used to determine whether a user profile of the user 211 that is associated with the enterprise internal core 251 is integrated with a second user profile of a the external gaming application system 231.

The disclosed systems and methods provide a specific improvement over prior systems in that it facilitates progressive gameplay in videogames that traditionally do not allow for saving a current progress level within the game. This improved gameplay development provides advantages including improved motivation for video game users to continue playing the game and improved satisfaction. Video game users would not lose the resources they have accumulated and the time and energy expended on advancing in the video game would be rewarded. The disclosed systems and methods provide improved multimedia content based on saving display positions on the graphical user interface of a current progress level. Further, the current progress level is accessible to the user based on verifying that authentication information that is received matches stored credentials of the user from a database of authorized users. This verification process can utilize encrypted authentication information that the system decrypts, where the decryption process transforms encrypted information into its original format. In general, the process of encryption transforms information from its original format (i.e., the plaintext) to an unreadable format (i.e., ciphertext), and decryption reconverts the information in its unreadable format back into its readable format.

Graphical user interface elements provided via multimedia content display a visual representation of information stored to a computer storage location. Various visual conventions to represent the information can include icons, widgets (i.e., graphical control elements), tabs, menus, windows, etc. and various interaction elements or interface objects (e.g., cursor, pointer, adjustment handle, etc.) can be used to interact with the visual representations. In this regard, the accumulated resources and current progress level may be depicted via such visual conventions. Further, the user may interact with such interface elements using interaction elements. According to one embodiment, the gam may be accessed using an interface element that includes a selectable link that is accessible from an enterprise application of a financial institution.

Figure 3:
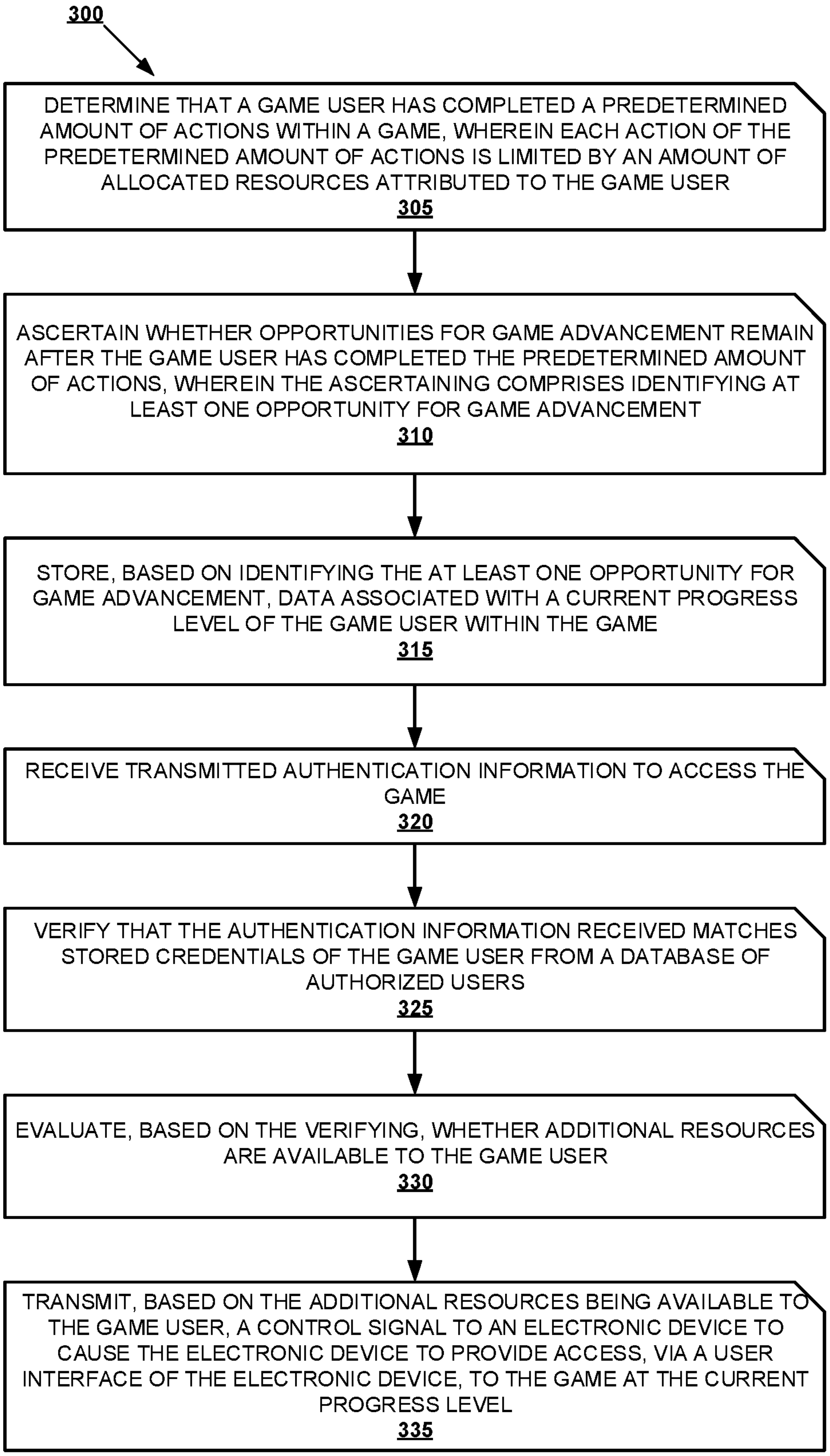
FIG. 3 depicts a block diagram of a method for facilitating progressive advancement, in accordance with an embodiment of the present invention.

FIG. 3 depicts a block diagram of a method 300 for facilitating progressive advancement, in accordance with an embodiment of the present invention. At block 305, the method includes determining that a game user has completed a predetermined amount of actions within a game. Such actions may performed through various interaction elements or interface objects displayed via the user interface of the electronic device. Further, each action of the predetermined amount of actions is limited by an amount of allocated resources attributed to the game user. For instance, the gameplay may require expense of in-game resources in order to advance, perform certain gameplay tasks, or otherwise make one or more gameplay moves/actions. Thus, the system tracks how many in-game resources the user has accumulated and expended and determines, based on this tracking, that the user has fulfilled all of the gameplay actions possible or otherwise completed a predetermined amount of actions within the game that would be permitted based on the current amount of allocated in-game resources are available or otherwise attributed to the user. According to one embodiment, the game is a single-player game in which the game user provides one or more inputs via a user interface of the electronic device to play the game.

At block 310, the computer system ascertains whether opportunities for game advancement remain after the game user has completed the predetermined amount of actions, where the ascertaining includes identifying at least one opportunity for game advancement. For example, once the predetermined amount of actions within the game that would be permitted based on the current amount of allocated in-game resources are available or otherwise attributed to the user are completed, the computer system analyzes whether there are unrealized opportunities or uncompleted tasks that could still be performed via the game. In one embodiment, the computer system may determine that the game is completed due to the user winning or losing the game, in which case the method 300 would have no need to store data associated with a current progress level. Thus, the next time the user attempts to play the game, a new round of the game will start at the beginning rather than mid-game. Alternatively, if the computer system ascertains that the current round of gameplay is incomplete, and there are opportunities for game advancement, then there would be an advantage for the computer system to save the game at a current progress level. By saving the current progress level, the time, energy, and in-game resources expended towards game advancement would not be wasted. According to one embodiment, expending the amount of allocated resources enables the game user to perform the predetermined amount of actions within the game, and the allocated resources include in-game resources having a predefined value. According to one embodiment, the computer system assigns a resource exchange rate to the predetermined amount of actions such that in order to perform the predetermined amount of actions, an in-game resource would need to be exchanged. In some examples, this exchange rate may be a 1:1 ratio, where each in-game move/action requires the user to expend a one resource. In other examples, the user may need to expend a plurality of resources in order to perform a single in-game move/action. Thus, the predetermined amount of actions are capable of being completed based on the amount of allocated resources due to the assigned resource exchange rate. According to various embodiments, the computer system may establish one or more rules directing accumulation of the amount of allocated resources attributed to the game user. For instance, the one or more rules may indicate that the user earns in-game resources by performing real-world tasks, that the in-game resources are earned automatically over a period of time, that the in-game resources are earned by performing in-game tasks, that the in-game resources are depleted based on the user failing to perform certain actions, etc. In some embodiments, the real-world actions are associated with financial objectives designated by the game user such as, for example, savings goals. For example, the user may earn allocated resources by depositing real-world financial resources (e.g., money) to one or more financial savings account(s).

At block 315, the computer system stores, based on identifying the at least one opportunity for game advancement, data associated with a current progress level of the game user within the game. This data may be stored to a data storage location such as a relational database that is managed through a relational database management system.

At block 320, the computer system receives transmitted authentication information to access the game. The authentication information may be received across a network, where the authentication that is received is encrypted, and the computer system decrypts the encrypted authentication information in order to verify, at block 325, that the authentication information received matches stored credentials of the game user from a database of authorized users. At block 330, the computer system evaluates, based on verifying that the authentication information received matches stored credentials of the game user, whether additional resources are available to the game user. At block 335, based on the additional resources being available to the game user, a control signal is transmitted to an electronic device to cause the electronic device to provide access, via a user interface of the electronic device, to the game at the current progress level. The control signal is transmitted across the network, where the network includes, according to one embodiment, a wireless network that has a plurality of network nodes.

According to various implementations, a user interface of the game is generated and transmitted to the electronic device, where the generated user interface includes a plurality of video images configured to depict the progressive advancement of gameplay of the game. This user interface is generated and transmitted in order to enable the user to perform the predetermined amount of actions within the game and to provide access, via the user interface, to the game at the current progress level. The user interface depicts how many resources remain and may also depict how many resources are required to perform certain actions.

According to various embodiments, the user is able to earn partial rewards based on partial gameplay. For instance, if completion of the game would result in the user earning a reward (e.g., an entry in a sweepstakes, a financial reward, etc.), then partial completion of gameplay would allow the user to earn a partial reward (e.g., a partial ticket). The partial rewards may be accumulated and the more rewards that are accumulated the greater the chances are that the user can earn the full reward. In one example, the user may play one mini-game and earn a certain number of in-game resources, but those resources may be insufficient to earn the full reward. Thus, the system saves the partial resources earned by the user so that the user can return, at a later time, to play the game to earn the remaining resources in order to earn the full reward. In some embodiments in which the reward is earned through chance, the more the user plays, the greater the odds are that the user will in a reward. Thus, the gameplay saves the progress made by the user so that the user does not lose credits towards the reward from the partial amount of gameplay completed.

Figure 4:
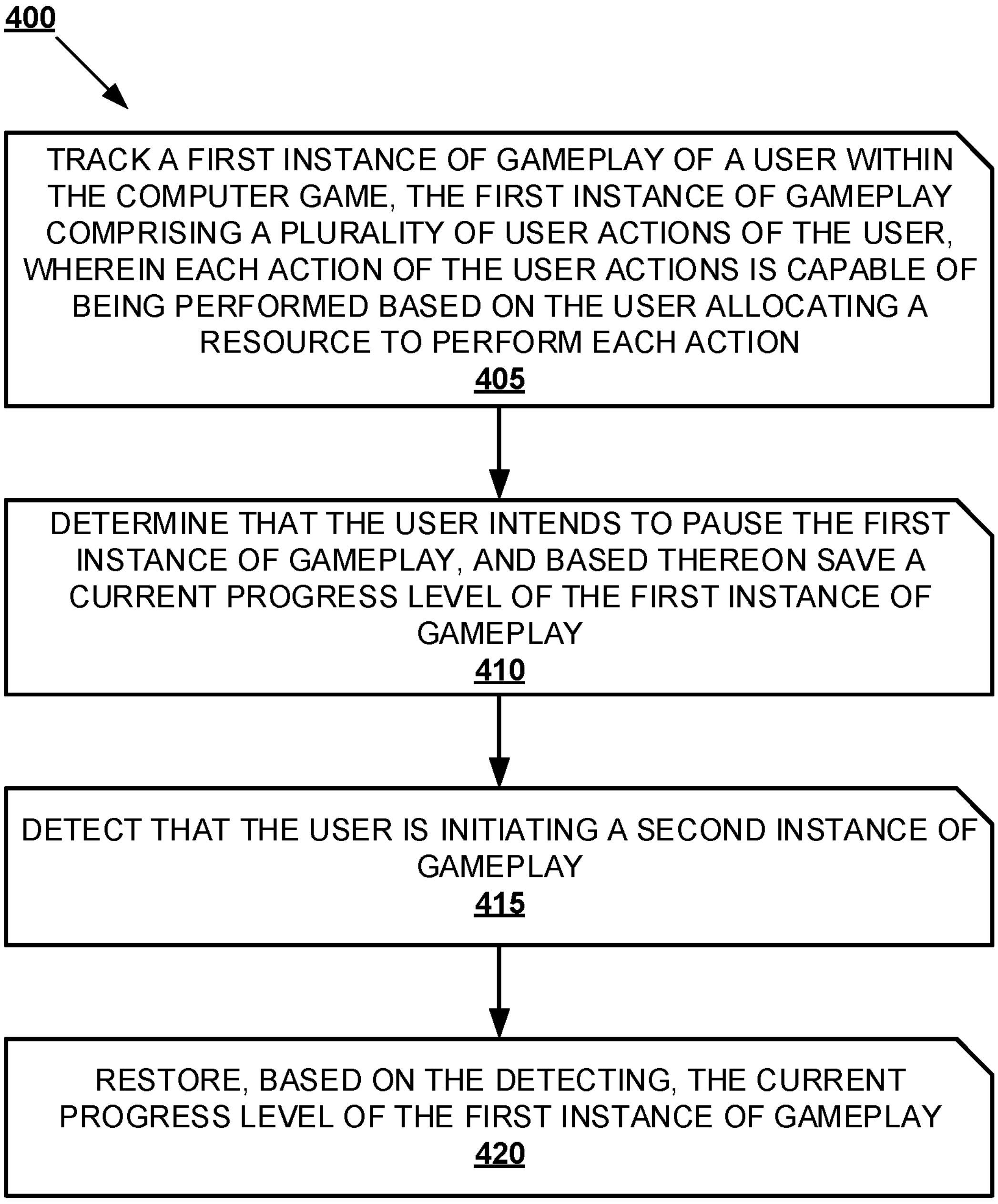
FIG. 4 depicts a block diagram of a method for facilitating progressive advancement via a computer game, in accordance with an embodiment of the present invention.

FIG. 4 depicts a block diagram of a method 400 for facilitating progressive advancement via a computer game, in accordance with an embodiment of the present invention. At block 405, a first instance of gameplay of a user within the computer game is tracked, where the first instance of gameplay includes a plurality of user actions of the user, where each action of the user actions is capable of being performed based on the user allocating a resource to perform each action. For instance, the resource may include an in-game resource that is earned (i) based on the user performing real-world tasks, (ii) automatically over a period of time, and/or (iii) by performing in-game tasks, etc. At block 410, the computer system determines that the user intends to pause the first instance of gameplay, and based thereon, the computer system saves a current progress level of the first instance of gameplay. Further, according to one embodiment, the first instance of gameplay includes at least one opportunity for game advancement that has not yet been completed by the user.

At block 415, the computer system detects that the user is initiating a second instance of gameplay and based thereon, at block 420, the computer system restores the current progress level of the first instance of gameplay. The second instance of gameplay may, according to one embodiment, require exchange of resources to enable the user to perform one or more additional user actions via the computer game. According to one embodiment, detecting that the user is initiating the second instance of gameplay includes receiving authentication information and verifying that the authentication information matches stored credentials of a database of authorized users. Further, restoring the current progress level includes transmitting a control signal to an electronic device to cause the electronic device to provide access, via a user interface of the electronic device to the game at the current progress level of the first instance of gameplay. In some embodiments, restoring the current progress level includes transmitting a control signal across a wireless network to an electronic device to initiate displaying the current progress level of the first instance of gameplay. The computer system may also be configured to generate and transmit a user interface of the computer game, where the generated user interface includes a plurality of video images associated with the current progress level of the first instance of gameplay.

Figure 5:
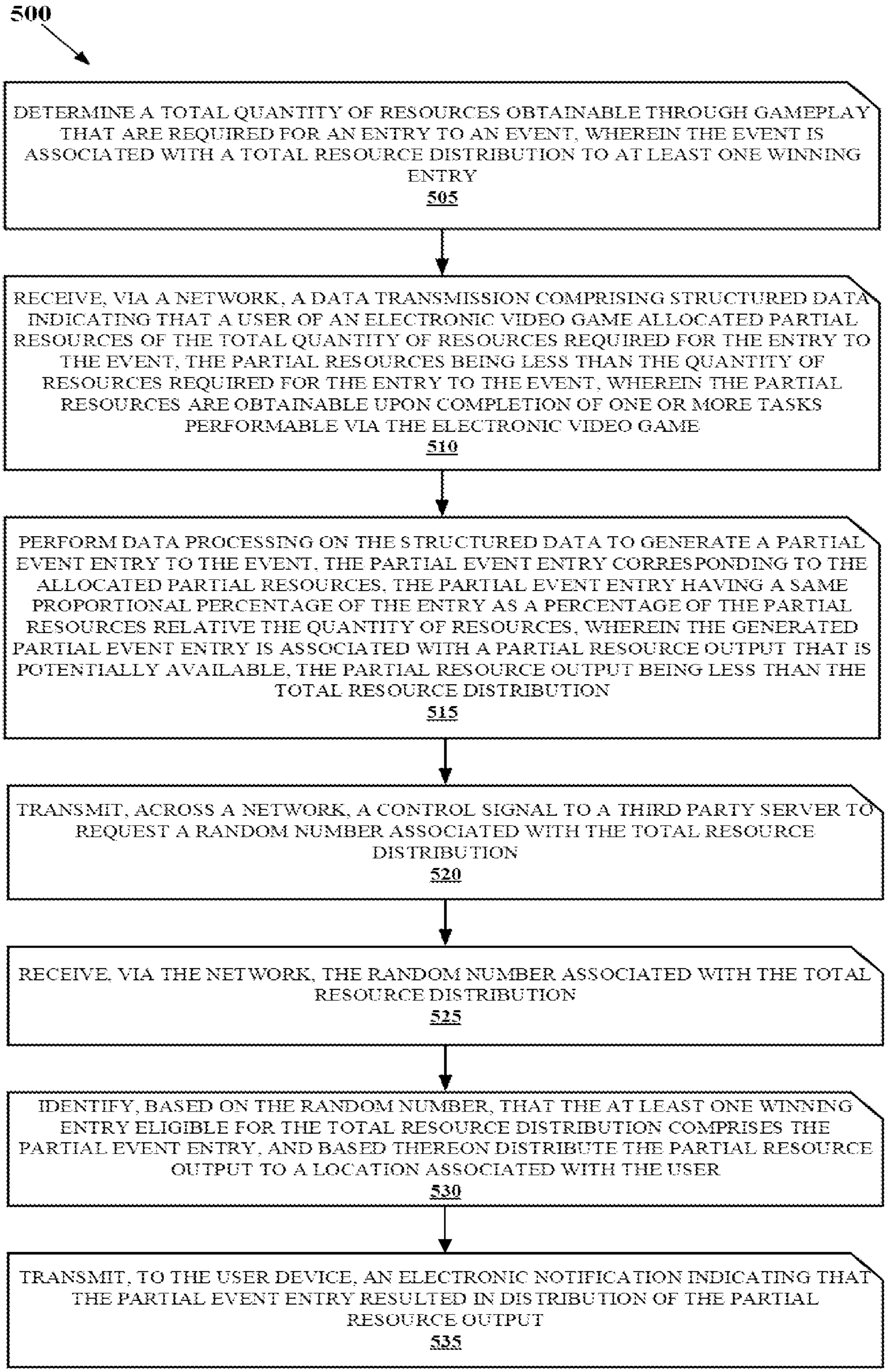
FIG. 5 depicts a block diagram of a method related to an electronic video game system, in accordance with an embodiment of the present invention.

FIG. 5 depicts a block diagram of a method 500 related to an electronic video game system, in accordance with an embodiment of the present invention. At block 505, the at least one processor determines a total quantity of resources obtainable through gameplay that are required for an entry to an event, wherein the event is associated with a total resource distribution to at least one winning entry. According to one embodiment, the event comprises a promotion associated with real-world resources.

At block 510, a data transmission comprising structured data indicating that a user of an electronic video game allocated partial resources of the total quantity of resources required for the entry to the event is received, via a network, where the partial resources being less than the quantity of resources required for the entry to the event, wherein the partial resources are obtainable upon completion of one or more tasks performable via the electronic video game. According to one embodiment, the partial resources were obtained based on the user performing less than a total number of tasks required to obtain the total quantity of resources. Further, according to one embodiment, a plurality of tasks of the total number of tasks are performed based on the user providing one or more inputs via a user interface that displays the electronic video game.

At block 515, data processing is performed on the structured data to generate a partial event entry to the event, the partial event entry corresponding to the allocated partial resources, the partial event entry having a same proportional percentage of the entry as a percentage of the partial resources relative the quantity of resources, wherein the generated partial event entry is associated with a partial resource output that is potentially available, the partial resource output being less than the total resource distribution.

At block 520, the at least one processor transmits, across a network, a control signal to a third party server to request a random number associated with the total resource distribution, and at block 525 receives, via the network, the random number associated with the total resource distribution.

According to one embodiment, the random number is produced via a random number generator. In some embodiments, the random number generator includes a true random number generator (TRNG) or a hardware random number generator (HRNG) that uses an unpredicted physical variable rather than an algorithm. The TRNG or HRNG generate numbers as a function of the current value of a physical environment's attribute that is constantly changing in a manner that is practically impossible to model. For example, the TRNG or HRNG may use radioactive decay of isotopes, airwave static, or an extremely sensitive temperature reading inside a computer board, measuring atmospheric noise, thermal noise, and/or external electromagnetic and quantum phenomena to generate random numbers. In alternative embodiments, a hybrid TRNG/HRNG and pseudorandom number generator (PRNG) may be used that takes randomness derived from various naturally random sources when such sources able to satisfy demand, but relies on periodically re-seeded cryptographically secure PRNGs (CSPRNGs) when the TRNG/HRNG is overwhelmed.

At block 530, the at least one processor identifies, based on the random number, that the at least one winning entry eligible for the total resource distribution comprises the partial event entry, and based thereon distribute the partial resource output to a location associated with the user. According to some embodiments, the location comprises a resource storage location comprising a unique identification number, and wherein the distributing of the partial resource output to the location is capable of being performed based on the user syncing a user profile associated with the location to a gaming profile of the user that the user uses to play the electronic video game. Further, the resource storage location may comprise an account configured to receive real-world resource deposits. At block 535, the at least one processor transmits, to the user device, an electronic notification indicating that the partial event entry resulted in distribution of the partial resource output.

According to various embodiments, a geographic position of the user device is determined to ensure the user is eligible to participate in the event based on the event being restricted by a geographic region. Further, the geographic position may be determined using global positioning system coordinates, the global positioning system coordinates being identified based on signals obtained from multiple satellites used to calculate the geographic position. In some embodiments, each satellite of the multiple satellites transmits a respective signal comprising a unique pseudorandom noise codes and satellite positioning data.

According to various embodiments, access to the electronic video game in order to allocate the partial resources is permitted based on authenticating the user device, the authenticating including verifying personally identifiable information.

Figure 6:
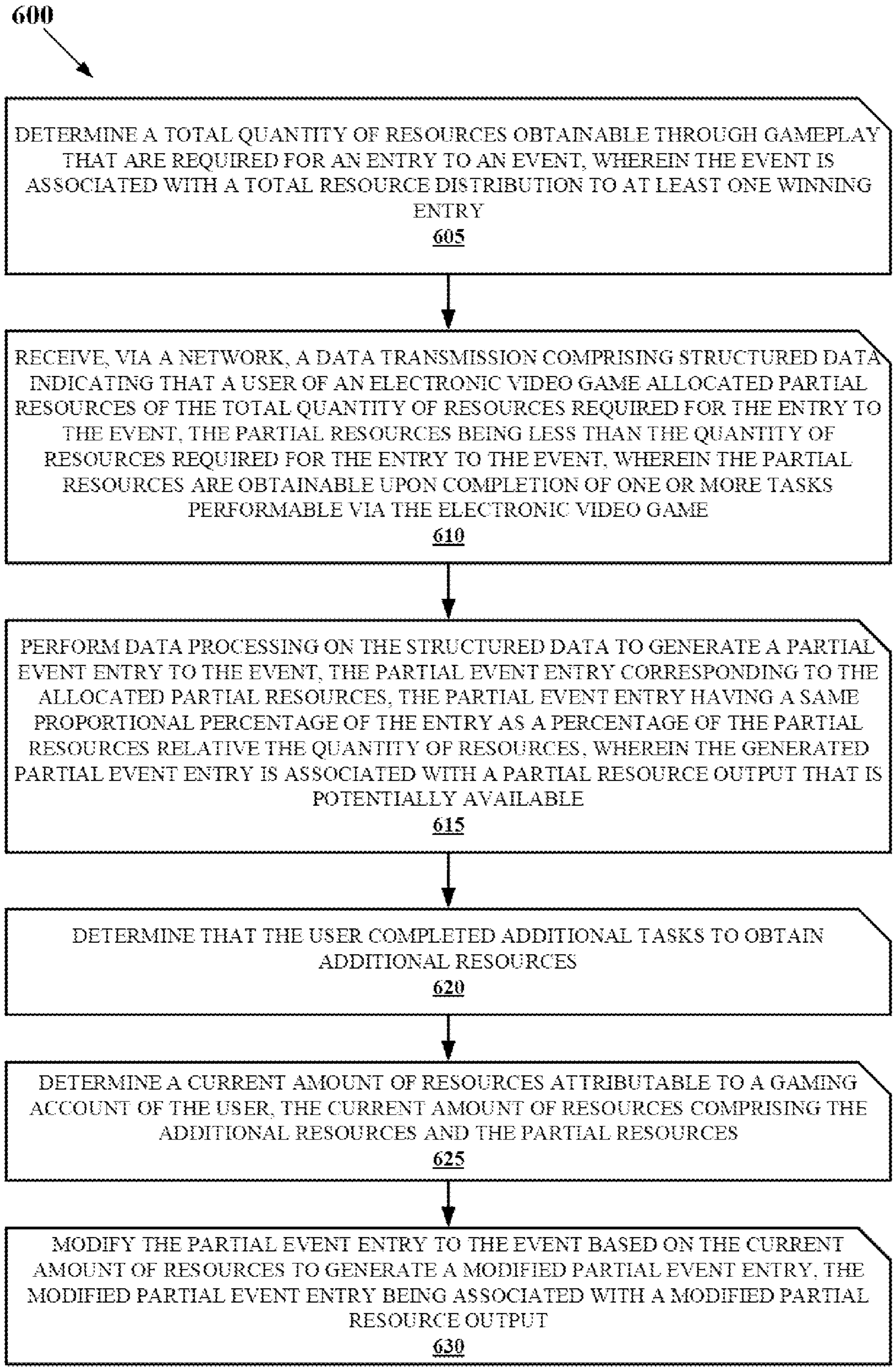
FIG. 6 depicts a block diagram of a method related to an electronic video game system, in accordance with an embodiment of the present invention.

FIG. 6 depicts a block diagram of a method 600 related to an electronic video game system, in accordance with an embodiment of the present invention. At block 605, the at least one processor determines a total quantity of resources obtainable through gameplay that are required for an entry to an event, wherein the event is associated with a total resource distribution to at least one winning entry. At block 610, the at least one processor receives, via a network, a data transmission comprising structured data indicating that a user of an electronic video game allocated partial resources of the total quantity of resources required for the entry to the event, the partial resources being less than the quantity of resources required for the entry to the event, wherein the partial resources are obtainable upon completion of one or more tasks performable via the electronic video game. At block 615, the at least one processor performs data processing on the structured data to generate a partial event entry to the event, the partial event entry corresponding to the allocated partial resources, the partial event entry having a same proportional percentage of the entry as a percentage of the partial resources relative the quantity of resources, wherein the generated partial event entry is associated with a partial resource output that is potentially available.

At block 620, the at least one processor determines that the user completed additional tasks to obtain additional resources, and at block 625 the at least one processor determines a current amount of resources attributable to a gaming account of the user, the current amount of resources comprising the additional resources and the partial resources. At block 630, the at least one processor modifies the partial event entry to the event based on the current amount of resources to generate a modified partial event entry, the modified partial event entry being associated with a modified partial resource output.

In some embodiments, the method 600 further includes transmitting, across a network, a control signal to a third party server to request a random number associated with the total resource distribution, and receiving, via the network, the random number associated with the total resource distribution. According to some embodiments, the random number is produced via a random number generator such as the types of random number generators described above. In some embodiments, the method 600 further includes identifying, based on the random number, that the at least one winning entry eligible for the total resource distribution comprises the modified partial event entry, and based thereon distribute the modified partial resource output to a location associated with the user. The method 600 may also include transmitting, to the user device, an electronic notification that the partial event entry resulted in distribution of the modified partial resource output.

In some embodiments, a geographic position of the user device is determined to ensure the user is eligible to participate in the event based on the event being restricted by a geographic region. Further, the geographic position may be determined using global positioning system coordinates, the global positioning system coordinates being identified based on signals obtained from multiple satellites used to calculate the geographic position.

Computer program instructions are configured to carry out operations of the present invention and may be or may incorporate assembler instructions, instruction-set-architecture (ISA) instructions, machine instructions, machine dependent instructions, microcode, firmware instructions, state-setting data, source code, and/or object code written in any combination of one or more programming languages.

An application program may be deployed by providing computer infrastructure operable to perform one or more embodiments disclosed herein by integrating computer readable code into a computing system thereby performing the computer-implemented methods disclosed herein.

Although various computing environments are described above, these are only examples that can be used to incorporate and use one or more embodiments. Many variations are possible.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to explain the principles of one or more aspects of the invention and the practical application thereof, and to enable others of ordinary skill in the art to understand one or more aspects of the invention for various embodiments with various modifications as are suited to the particular use contemplated.

It is to be noted that various terms used herein such as "Linux®," "Windows®," "macOS®," "iOS®," "Android®," and the like may be subject to trademark rights in various jurisdictions throughout the world and are used here only in reference to the products or services properly denominated by the marks to the extent that such trademark rights may exist.

What is claimed is:

1. A computer gaming system for facilitating progressive advancement, the computer system comprising:

at least one processor;

a communication interface communicatively coupled to the at least one processor; and a memory device storing executable code that, when executed, causes the at least one processor to:

determine that a game user has completed a predetermined amount of actions within a game, wherein each action of the predetermined amount of actions is limited by an amount of allocated resources attributed to the game user;

ascertain whether opportunities for game advancement remain after the game user has completed the predetermined amount of actions, wherein the ascertaining comprises identifying at least one opportunity for game advancement;

store, based on identifying the at least one opportunity for game advancement, data associated with a current progress level of the game user within the game;

receive transmitted authentication information to access the game;

verify that the authentication information received matches stored credentials of the game user from a database of authorized users, and based on the verifying evaluate whether additional resources are available to the game user;

transmit, based on the additional resources being available to the game user, a control signal to an electronic device to cause the electronic device to provide access, via a user interface of the electronic device, to the game at the current progress level; and generate, based on the game user allocating partial resources less than a total quantity of resources required for a full entry to an event, a partial event entry having a proportional percentage of the full entry corresponding to the partial resources, wherein the partial event entry is associated with a proportionally reduced resource output.

2. The computer gaming system of claim 1, wherein the executable code, when executed, further causes the at least one processor to assign a resource exchange rate to the predetermined amount of actions, wherein the predetermined amount of actions are capable of being completed based on the amount of allocated resources due to the assigned resource exchange rate.

3. The computer gaming system of claim 1, wherein the executable code, when executed, further causes the at least one processor to establish one or more rules directing accumulation of the amount of allocated resources attributed to the game user.

4. The computer gaming system of claim 1, wherein the executable code, when executed, further causes the at least one processor to generate and transmit the user interface of the game, wherein the generated user interface comprises a plurality of video images configured to depict the progressive advancement of gameplay of the game.

5. The computer gaming system of claim 1, wherein the game comprises a single-player game in which the game user provides one or more inputs via a user interface of the electronic device to play the game.

6. The computer gaming system of claim 1, wherein the control signal is transmitted across a wireless network, the wireless network comprising a plurality of network nodes.

7. The computer gaming system of claim 1, wherein the expending the amount of allocated resources enables the game user to perform the predetermined amount of actions within the game, wherein the allocated resources comprise in-game resources having a predefined value, wherein the in-game resources are earnable based on the game user performing real-world actions associated with financial objectives designated by the game user.

8. The computer gaming system of claim 7, wherein the financial objectives comprise financial savings goals and the real-world actions comprise financial deposits to one or more financial savings accounts.

9. The computer gaming system of claim 1, wherein the game is accessible via a link from an enterprise application of a financial institution.

10. The computer gaming system of claim 1, wherein the received authentication information is encrypted, and based on receiving the authentication information the executable code, when executed, causes the at least one processor to decrypt the encrypted authentication information.

11. A computer-implemented method for facilitating progressive gameplay advancement, the computer-implemented method comprising:

determining that a game user has completed a predetermined amount of actions within a game, wherein each action of the predetermined amount of actions is limited by an amount of allocated resources attributed to the game user;

ascertaining whether opportunities for game advancement remain after the game user has completed the predetermined amount of actions, wherein the ascertaining comprises identifying at least one opportunity for game advancement;

storing, based on identifying the at least one opportunity for game advancement, data associated with a current progress level of the game user within the game;

receiving transmitted authentication information to access the game;

verifying that the authentication information received matches stored credentials of the game user from a database of authorized users, and based on the verifying evaluating whether additional resources are available to the game user;

transmitting, based on the additional resources being available to the game user, a control signal to an electronic device to cause the electronic device to provide access, via a user interface of the electronic device, to the game at the current progress level; and generating, based on the game user allocating partial resources less than a total quantity of resources required for a full entry to an event, a partial event entry having a proportional percentage of the full entry corresponding to the partial resources, wherein the partial event entry is associated with a proportionally reduced resource output.

12. The computer-implemented method of claim 11, further comprising assigning a resource exchange rate to the predetermined amount of actions, wherein the predetermined amount of actions are capable of being completed based on the amount of allocated resources due to the assigned resource exchange rate.

13. The computer-implemented method of claim 11, further comprising establishing one or more rules directing accumulation of the amount of allocated resources attributed to the game user.

14. The computer-implemented method of claim 11, wherein the game comprises a single-player game in which the game user provides one or more inputs via a user interface of the electronic device to play the game.

* * * * *